ary or loaded patented May 28, 1963

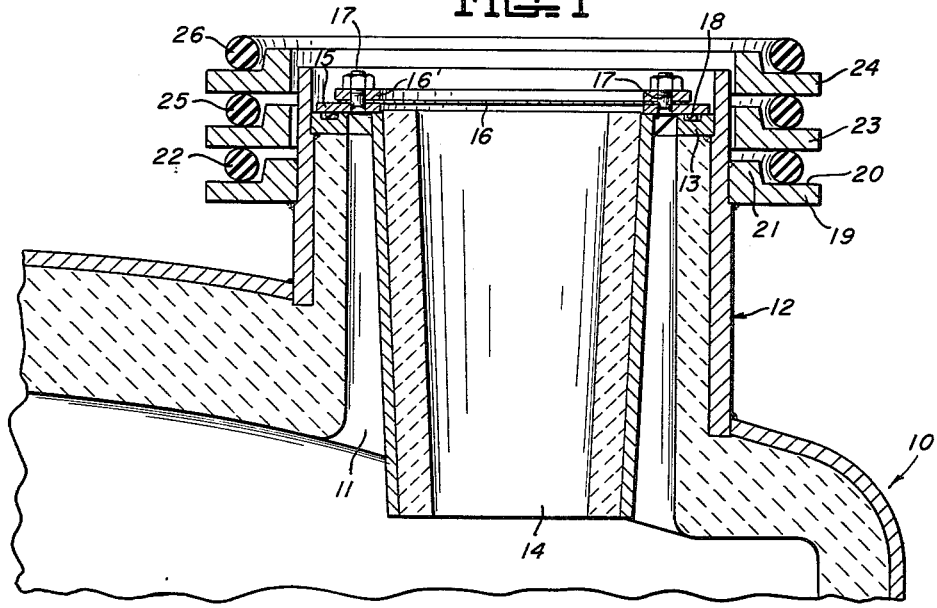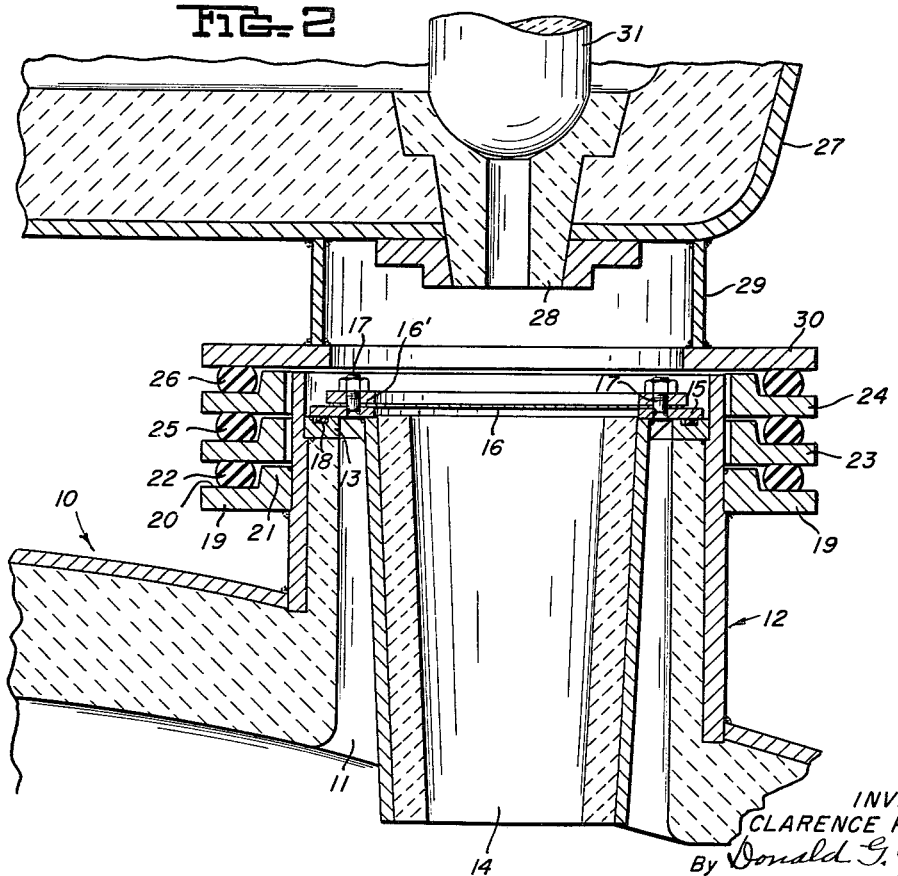

3,091,265
VACUUM-SEALED FLEXIBLE PORT UNION
Clarence P. Ulstad, McCandless Township, Allegheny County, Pa., assignor to United States Steel Corporation, a corporation of New Jersey
Filed June 22, 1961, Ser. No. 118,852
3 Claims. (Cl. 141—383)

This invention relates to a separable union or joint between vessels, one of which is subjected to high vacuum.

In certain industrial operations, it is desired to make a temporary sealed connection between a chamber under high vacuum, such as that employed for the vacuum-casting of steel, and a cooperating vessel such as a teeming ladle. These ladles are large and very heavy when full and must be handled by a traveling crane which does not permit very precise positioning for the purpose of alinement. In addition, the time available does not permit the use of a bolted joint which would have to be made up by hand. It is accordingly the object of my invention to provide a sealed union for the bottom port of the ladle and the top inlet opening of a vacuum casting chamber which does not require accurate alinement and involves no manual operations yet serves to seal the joint against leakage under the highest vacua employed.

Speaking generally, my invention comprises a set of alternating multiple sealing and bearing rings fitted on a neck upstanding from the vacuum chamber, adapted to be engaged and compressed by a bearing collar on the bottom of a ladle coaxial with the teeming port thereof, when the ladle is lowered from a position above the chamber. The bottom bearing ring is welded to the neck and each of the multiple bearing rings has a flange which engages the next ring above after predetermined compression of the sealing rings and prevents further compression thereof.

A complete understanding of the invention may be obtained from the following detailed description and explanation which refer to the accompanying drawings illustrating the present preferred embodiment. In the drawings:

FIGURE 1 is an axial section through the neck of a vacuum chamber fitted with my improved seal in its normal or unloaded condition; and FIGURE 2 is a similar view showing the seal compressed to effective condition under the load of a superimposed ladle.

Referring now in detail to the drawings and, for the present, particularly to FIGURE 1, the removable cover 10 of a vacuum casting chamber has an inlet port 11 therein surrounded by an upstanding neck 12. A ring 13 set in the upper portion of the neck removably supports a spout or funnel-tube 14 by engaging a peripheral ring 15 around the upper end thereof. A closure in the form of a disc 16 of thin sheet metal such as aluminum is clamped to ring 15 by a ring 16' drilled to receive studs 17 upstanding from ring 15. Ring 13 carries a compressible sealing ring 18 engageable by ring 15.

The seal of my invention comprises a bearing ring 19 extending around neck 12 below the top thereof and welded thereto. Ring 19 has a plane bearing surface 20 and an upwardly projecting internal flange 21. An annular sealing ring 22 of rubber or like material rests on surface 20 coaxially with neck 12. The normal or original diameter of a section of ring 22, as shown, is somewhat greater than the height of flange 21 above surface 20. Additional bearing rings 23 and 24 similar to ring 19 are disposed loose on neck 12, above ring 22, alternating with additional sealings rings 25 and 26 similar to ring 22. Rings 23 and 24 have an internal diameter slightly greater than the external diameter of the portion of neck 12 where they are located, to permit free movement axially thereof.

When closure 16 has been tightly clamped by nuts on studs 17, evacuation of vessel 10 may be initiated through suitable connections to appropriate pumps (not shown). On attaining the desired degree of vacuum within the chamber, a teeming ladle 27 is spotted thereover with its bottom port 28 in approximate alinement with neck 12, as shown in FIGURE 2. A short neck 29 surrounds port 28 and has a bearing collar 30 on the bottom thereof adapted to engage ring 26. Such engagement occurs as the ladle is lowered and all the sealing rings are compressed with slightly downward movement of rings 23 and 24.

A fixed support may be provided for the ladle during pouring or it may continue suspended from the traveling crane. In either case, flanges 21 on rings 19, 23 and 24 limit compression of the seal after about 25% compression of rings 22, 25 and 26, by engagement with the ring thereabove or collar 30. By reason of the number of bearing and sealing rings and the clearance between the loose bearing rings and neck 12, the seal is self-alining, i.e., it is flexible and permits slight angularity between collar 30 and the horizontal without breaking the vacuum established in chamber 10.

On opening port 28 by raising the stopper rod 31, molten metal descends therefrom, melts closure 16 and flows into a mold in chamber 10. My improved seal guards against the entrance of air through the joint between the ladle and vacuum chamber and this ensures thorough degassing of the metal being poured.

The seal of my invention has many advantages. It requires no operation other than lowering the ladle from above the vacuum chamber. Neither exact spotting nor alinement of the ladle spout is essential. A vacuum-tight seal is automatically effected yet overloading of the sealing rings is prevented. The sealing rings, furthermore, are fully exposed for atmospheric cooling. The seal assembly may readily be removed and replaced for maintenance or renewal.

Although I have disclosed herein the preferred embodiment of my invention, I intend to cover as well any change or modification therein which may be made without departing from the spirit and scope of the invention.

I claim:

1. A vacuum-sealed connection between a receiving vessel and a delivery vessel adapted to be lowered thereon, comprising an upstanding neck on the receiving vessel, a bearing ring fixed on the neck intermediate its ends and a plurality of alternating sealing and intermediate bearing rings loosely surrounding said neck and forming a stack on said first-mentioned bearing ring, said delivery vessel having a bottom port and a bearing surface extending around said port, said bearing surface being dimensioned to make flatwise engagement with the topmost ring of said stack, without the necessity of exact alinement of the port and the neck.

2. A connection as defined in claim 1, characterized by said intermediate bearing rings each having an upstanding internal flange adapted to be engaged by the bearing ring thereabove after predetermined compression of said sealing rings.

3. A connection as defined in claim 1, characterized by each of said intermediate bearing rings having plane peripheral seating surfaces for said sealing rings.

References Cited in the file of this patent
UNITED STATES PATENTS

| | | |
|---|---|---|
| 2,422,158 | Wolfram | June 10, 1947 |
| 2,437,632 | Wolfram | Mar. 9, 1948 |
| 2,537,249 | Walton | Jan. 9, 1951 |
| 2,919,147 | Nenzell | Dec. 29, 1959 |